Jan. 13, 1959 E. J. CIESLUK 2,867,950
APPARATUS FOR REMOVING CARBON FROM THE COMBUSTION
CHAMBER OF AN INTERNAL COMBUSTION ENGINE
Filed Sept. 15, 1955 3 Sheets-Sheet 1
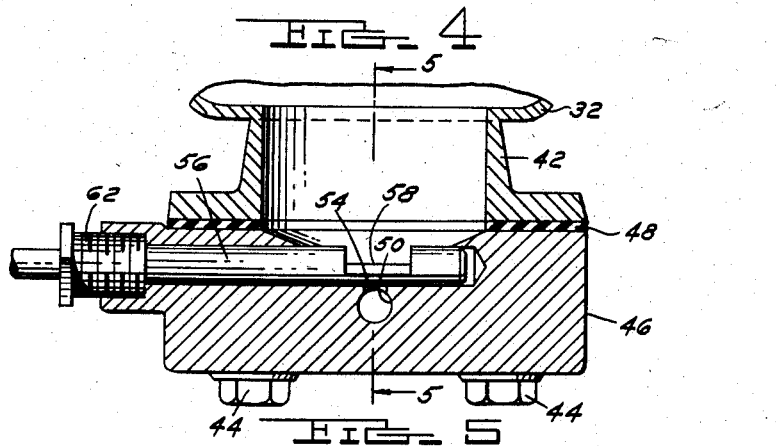
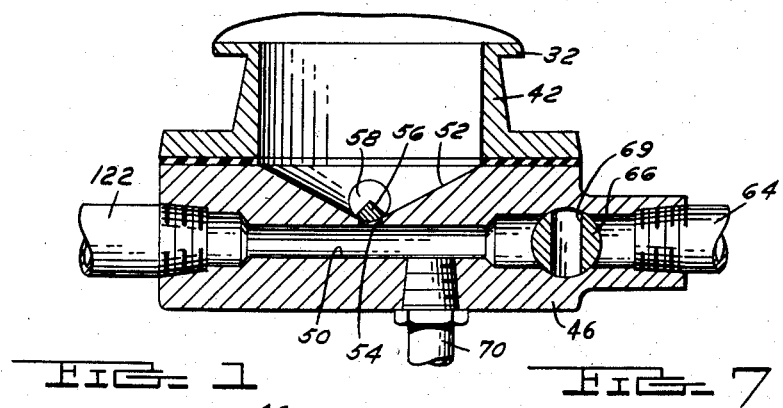
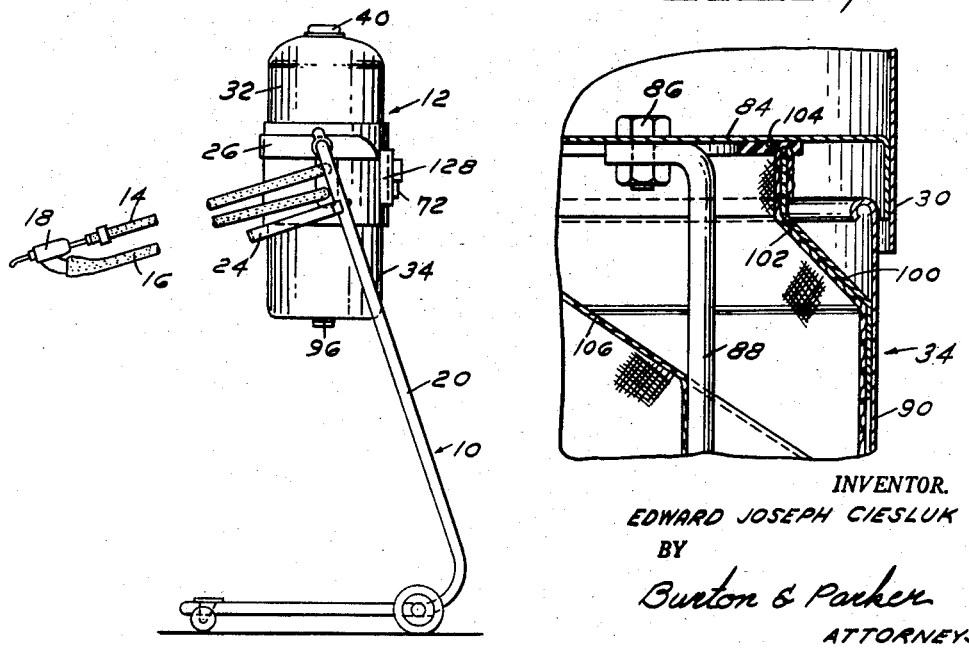
INVENTOR.
EDWARD JOSEPH CIESLUK
BY
Burton & Parker
ATTORNEYS

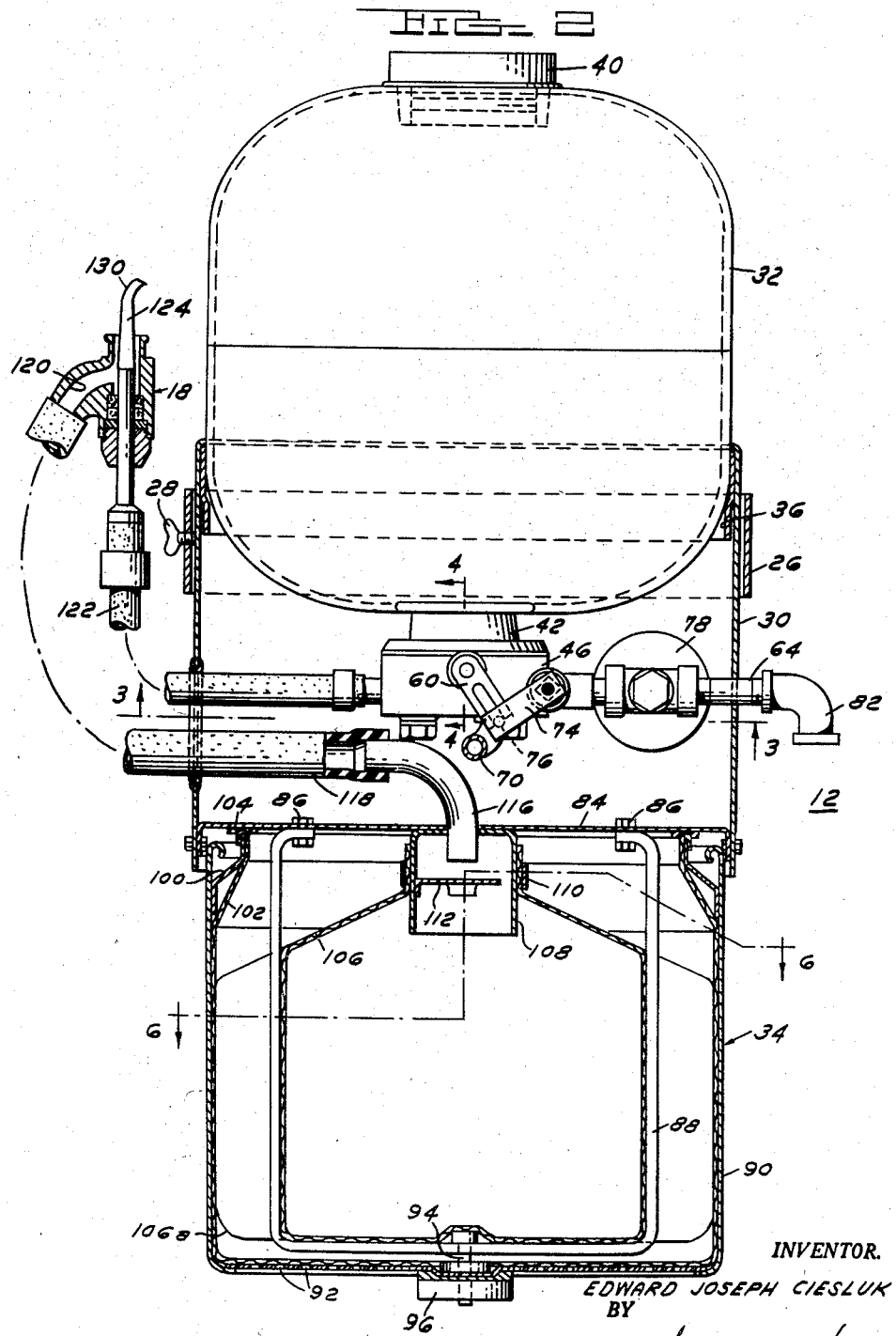

Jan. 13, 1959  E. J. CIESLUK  2,867,950
APPARATUS FOR REMOVING CARBON FROM THE COMBUSTION
CHAMBER OF AN INTERNAL COMBUSTION ENGINE
Filed Sept. 15, 1955  3 Sheets-Sheet 3
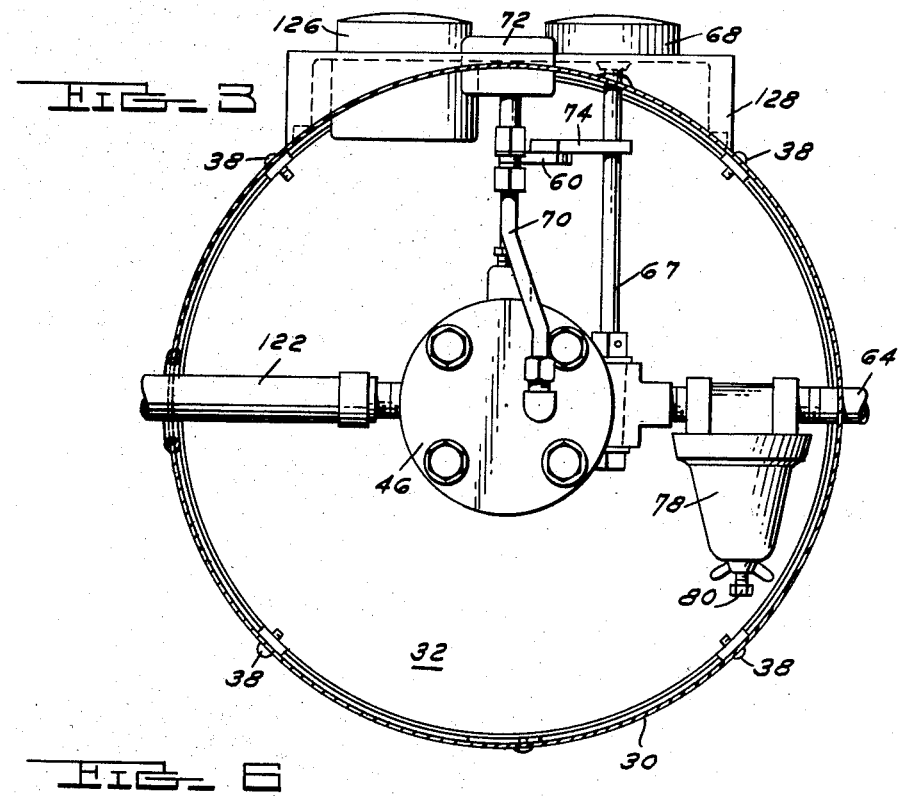
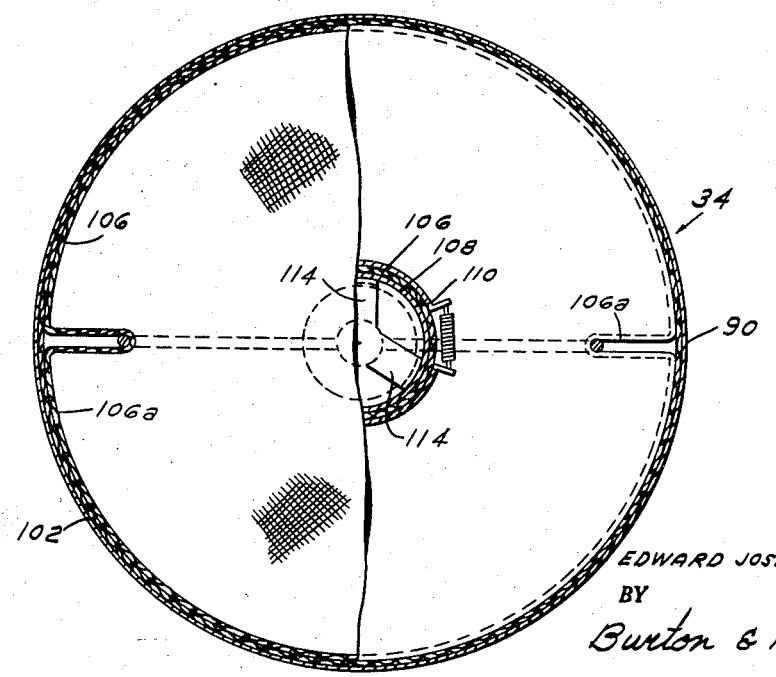
INVENTOR.
EDWARD JOSEPH CIESLUK
BY
Burton & Parker
ATTORNEYS

2,867,950

APPARATUS FOR REMOVING CARBON FROM THE COMBUSTION CHAMBER OF AN INTERNAL COMBUSTION ENGINE

Edward Joseph Ciesluk, Jackson, Mich., assignor to Kent-Moore Organization, Inc., Detroit, Mich., a corporation of Michigan Application September 15, 1955, Serial No. 534,516

3 Claims. (Cl. 51—8)

This invention relates to a method of and apparatus for removing carbon and other waste or fouling materials from the interior surfaces of internal combustion engine cylinders without removing the cylinder heads.

Attention is invited to the patent of Graham, 2,651,887, and the patent of Pyciak, 2,730,842, dated January 17, 1956, which disclose a method of and apparatus for the removal of carbon and waste products from the cylinders of internal combustion engines without the necessity for removing the cylinder head, and with respect to which the invention herein disclosed is an improvement. As disclosed in such patents, apparatus is provided for entraining hard combustible blast granules in an air stream which is directed through the spark plug opening of the cylinder, with the air stream and blast granules impinging upon the inner wall surfaces of the cylinder and loosening the waste materials adhering thereto, with the air stream carrying the waste materials and spent blast granules back out through the spark plug opening and discharging them into a filtering device. This operation of the apparatus includes first measuring a determined quantity of blast granules into a mixing chamber of the apparatus and then passing streams of compressed air through the mixing chamber to agitate the blast granules and entrain them in one of the air streams, and thereafter passing the entrained granules to the engine cylinder.

While the method of and apparatus for cleaning cylinders as disclosed in the Graham patent and Pyciak Patent No. 2,730,842 are effective and clean the cylinders, certain drawbacks inherent in the design of the apparatus have led to the development of the improved method and apparatus herein disclosed.

A primary object of the present invention is the provision of a method of and apparatus for cleaning the inner surfaces of cylinders in internal combustion engines while using a substantially lesser amount of compressed air than was necessary with the prior apparatus of the said Graham patent or co-pending application. Such large amounts of compressed air were necessary with the prior devices that many automotive service garages were not equipped with sufficiently large air compressor units to furnish the required amount of compressed air.

A concomitant object of the invention is the provision of a method for cleaning the inner wall surfaces of cylinders of internal combustion engines which comprises pressurizing a storage receptacle of blast granules, gravity feeding blast granules directly from such storage chamber into a stream of compressed air flowing to the cylinder to be cleaned, directing the air and entrained granules through the spark plug opening of the cylinder and against the fouled inner wall surfaces and thereafter exhausting the waste products from the cylinder and filtering such products from the exhausted air.

Another object of the invention is the provision in apparatus for blast cleaning the interior of internal combustion engine cylinders of a blast granule storage receptacle communicating with a mixing chamber adapted to receive blast granules directly from the storage receptacle while air pressure is applied to the mixing chamber, and which storage receptacle is provided with a sealable filling closure and is adapted to withstand the air pressure developed in the mixing chamber, whereby the blast granules may be continuously fed to the mixing chamber from the storage receptacle while air pressure is applied to the mixing chamber such that the blast granules entering the mixing chamber from the storage receptacle are immediately entrained in the air stream passing therethrough and the air pressure in the storage receptacle equals the air pressure in the mixing chamber, and as a result it is unnecessary to first measure a determined quantity of blast granules into the mixing chamber as with the prior devices.

Another object of the invention is the provision of apparatus for the purpose mentioned which includes a storage receptacle for blast granules and which is of an airtight construction and adapted to withstand the air pressure of an air stream flowing to the engine cylinder, with a mixing chamber communicating with the receptacle through the bottom thereof and providing an air passageway into which the receptacle directly empties, with a valve between the receptacle and such passageway adapted to control the feed of blast granules into an air stream passing through the passageway, and another valve in the passageway adapted to control the flow of air therethrough.

Another object of the invention is the provision in apparatus of the character mentioned of an air control valve and a granule entrainment valve with connecting means operably coupling the valves together whereby upon actuation of the air control valve to one position the entrainment valve is opened, and upon actuation of the air control valve to either of two other positions the entrainment valve is closed. A feature of such connecting means resides in the arrangement thereof such that the air control valve is opened before the entrainment valve opens whereby air is flowed through the mixing chamber prior to the discharge of blast granules into the mixing chamber.

Another object of the invention is the provision of apparatus for the purpose mentioned which includes a casing having at the upper end a granule storage receptacle and at the lower end a filter pod, with the pod being open at the top and with means sealingly connecting such open end with the bottom of the casing, and with filter means engaged by said sealing means and held in position within the pod, and with the bottom of the pod being perforated to permit the escape of air discharged into said filtering means.

Still another object of the invention is the provision of a casing having at the upper end a granule storage receptacle provided with a filling closure at the top and with a filter pod removably coupled to the casing at the lower end, with the casing mounted on a supporting stand for rotatable displacement about a horizontal axis from an operative position in which the storage receptacle and filter pod lie in a substantially vertical plane to a filter pod cleaning position in which they lie in a plane angularly related to such vertical plane.

Another advantage of the invention resides in the combination of my improved mixing chamber and an air pressure regulator in that a substantially constant ratio of blast granules to air is maintained which results in a more thorough and efficient cleaning of the engine cylinders than with the prior devices.

Other objects, advantages, and meritorious features will more fully appear from the specification, claims, and accompanying drawing, wherein:

Fig. 1 is a side view of my improved apparatus;

Fig. 2 is a vertical cross sectional view through the blast unit shown mounted on the carriage in Fig. 1;

Fig. 3 is a cross sectional view taken on the line 3—3 of Fig. 2;

Fig. 4 is cross sectional view taken on the line 4—4 of Fig. 2;

Fig. 5 is a cross sectional view taken on the line 5—5 of Fig. 4;

Fig. 6 is a cross sectional view taken on the line 6—6 of Fig. 2; and

Fig. 7 is a cross sectional fragmentary view through the sealed connection between the filter pod and casing.

Fig. 1 illustrates the general arrangement of my improved apparatus. A wheeled supporting stand 10 is adapted to support at its upper end the blasting unit 12 from which lead the blast and exhaust hoses 14 and 16 provided with the nozzle assembly 18 which is adapted to be connected with the spark plug opening of the engine cylinder to be cleaned. The construction of the nozzle assembly is more fully described in the said Graham patent and in the co-pending application of Pyciak, Serial No. 353,371, filed May 6, 1953 which has issued as Patent No. 2,720,057, dated October 11, 1955.

The wheeled stand 10 is generally L-shaped as shown and includes a frame bent to define a pair of spaced apart upstanding frame members 20 (only one of which is shown in Fig. 1). Near the upper end of the stand an arcuate strut 24, serving as a stop as hereinafter described, extends between the frame members 20. A blast unit supporting band 26 is pivotally mounted at the upper end of the stand between the frame members 20 in any convenient fashion to pivot about a substantially horizontal axis. This band 26, which is shown in Figs. 1 and 2, is adapted to releasably support, by means of thumb screws such as at 28, the blast unit 12 of my improved apparatus, for swingable movement about a horizontal axis from the position shown in Fig. 1, in which swingable movement in one direction is limited by the stop 24, to a position at substantially right angles to that shown, all for a purpose hereinafter described.

The blast unit 12 includes a casing 30 within the upper end of which is telescoped a blast granule storage receptacle 32 and within the lower end of which is telescoped, spaced from the storage receptacle, a filter pod 34. An annular skirt 36, secured to the storage receptacle in any convenient manner, as by welding, is adapted to abut the inner wall surface of the casing and be secured thereto as by screws or the like 38 as shown in Fig. 3. A filling cap or closure 40 is provided at the top of the receptacle. The receptacle is of a pressure tank type construction and is adapted to withstand the air pressure developed by service garage air compressors.

The bottom of the storage receptacle is shaped to provide a depending annular flange 42 as shown in Figs. 2, 4, and 5, to which is secured, by means of bolts or the like 44, a granule mixing chamber 46. A gasket 48, sandwiched between the flange and the mixing chamber, seals the escape of air and blast granules from therebetween. Extending transversely through the mixing chamber is an air passageway 50 into which the storage receptacle opens directly through the sloping floor 52 defined by the mixing chamber, with a port 54 extending between the sloping floor 52 and the passageway 50.

Controlling the feed of blast granules into the passageway 50 is a granule feed control or entrainment valve 56, extending perpendicularly with respect to the passageway 50 through the mixing chamber and disposed at the bottom of the sloping floor 52 and in sealing relation with port 54. The valve 56 is cut away immediately above port 54, as shown in Figs. 4 and 5, throughout substantially 270° to define the slot 56 which, when the valve is in the position shown in Fig. 5, will prevent the flow of blast granules through port 54, but which when the valve is turned in either direction beyond the position shown in Fig. 5, will permit the flow of granules out of the storage receptacle and into the passageway 50 of the mixing chamber. It is apparent that by adjustment of the valve 56 a limited rate of granule flow may be obtained. Mounted upon the free end of valve 54 is the bifurcated arm 60 shown in Fig. 2. A packing nut 62, shown in Fig. 4, seals the escape of compressed air along the valve.

Within the air inlet end of the mixing chamber passageway 50 is threadedly received the end of a compressed air line 64. Between such line and the granule control valve 56 is an air control valve 66 having a stem 67, as shown in Fig. 3, provided with a knob 68, with a transverse passageway 69 extending through the valve and alignable with the air passageway 50 upon determined rotation of the knob. Threadedly received in the mixing chamber and communicating with the passageway 50 is an air gauge line 70, leading, as shown in Fig. 3, to the air gauge 72. Mounted on the valve stem 67 of the air control valve is the arm 74 provided with a pin 76 adapted to be received within the slot of the bifurcated arm 60 for a purpose hereinafter mentioned. In the air inlet line 64, before the air control valve, is an air pressure regulator valve 78 which is of conventional construction and is adjustable by means of the screw 80 to set the maximum air pressure which may be admitted to the mixing chamber. This pressure regulator ensures that the air pressure admitted to the mixing chamber does not exceed a pre-set maximum. The fitting 82 on the air intake line 64 is adapted to be coupled with an air hose from an air compressor to supply compressed air to the apparatus.

Spaced inwardly from the lower end of the casing 30, and secured thereto as by screws or the like 83, is an annular imperforate partition 84. Secured to this partition by bolts 86 is the generally U-shaped depending bracket 88 to which the filter pod 34 is releasably coupled and which serves to hold the filter pod in place in the casing. The pod itself includes a cylindrical housing or shell 90 open at the top and closed at the bottom by a perforated floor 92. A bolt 94, secured to the bracket 88, is adapted to extend through an aperture in the floor with a sealing washer 96 and nut 98 received over the bolt and adapted to overlie the perforated floor to retain the pod in the casing.

Secured as by spot welding or the like to the cylindrical housing 90 adjacent the upper edge is an inwardly stepped annular shoulder 100. A secondary filter bag 102 fills the housing 90 and overlies the walls and floor thereof and is folded over the upper edge of the shoulder 100 as shown in Fig. 2. A resilient annular gasket 104 is cemented or otherwise secured to the partition 84 as shown in Figs. 2 and 7. The upper edge of shoulder 100 with the margin of the secondary filter bag 102 folded thereover is adapted to be urged against the gasket 104 to form an air-tight seal therewith as the hand nut 96 at the bottom of the pod is tightened. Because the open upper end of the filter pod housing is sealed against the gasket 104 the only escape for air within the pod is cut through the perforate floor 92 of the housing.

Disposed within the pod and within the secondary filter bag is the primary filter bag 106 which, when compressed air is exhausted thereinto, balloons out around the bracket 88 as at 106a in Figs. 2 and 6 to fill the pod and overlie the secondary filter bag. The primary filter bag is clamped at its mouth about the inverted cup-shaped baffle assembly 108 by the spring tensioned clamping band 110 shown in Figs. 2 and 6. Secured within the baffle assembly in any convenient manner is a baffle 112 having three radially projecting arms 114 against the apex of which the discharge end 116 of exhaust line 118 discharges. The cup assembly and discharge spout 116 of the exhaust line are secured together in airtight relation and to the partition 84 in any convenient fashion.

The exhaust line 118 comprises a flexible hose which is secured at one end to the spout 116 and extends through a provided aperture in the casing to the nozzle assembly 18 where it is secured to the end of the exhaust passageway 120. The air inlet hose 122 of the nozzle assembly is coupled at one end to the discharge side of the passageway 50 of the mixing chamber and extends through a provided aperture in the casing 30 and is coupled at its other end to the nozzle 124 of the nozzle assembly. Means described in Pyciak Patent 2,730,842, dated January 17, 1956, are adapted to couple the nozzle assembly to the spark plug opening of the engine cylinder to be cleaned. Any entrained blast granules and air are blown into the cylinder through the nozzle 124 and discharged from the cylinder through the discharge passageway 120.

As shown in Fig. 3 a timer 126 is mounted on the exterior of the casing 30. The timer is of conventional construction and may be manually set to ring a bell upon the expiration of a given time interval. I have found that about 3 minutes of blasting of each engine cylinder is adequate for cleaning the same and therefore the timer may have a time interval of this or a somewhat longer length if desired.

A suitable panel 128 may be mounted in any convenient manner on the outside of casing 30 with the air control knob 68, air pressure gauge 72, and timer 126 mounted thereon as shown in Figs. 1 and 3. The panel may be marked to indicate an "off," "blast," and "clean" positions of knob 68.

The operation of the mixing chamber is as follows. When the knob 68 is turned to the "off" position, the air control valve 66 is disposed in the position shown in Fig. 5 such that no air can pass through the passageway 50. When disposed in the "off" position the arms 60 and 74 are disposed in the position shown in Fig. 2 with the granule control valve 56 closed to prevent the flow of blast granules out of the storage receptacle and into passageway 50. When the air control knob is turned to the "blast" position as indicated on the panel 128, the valve is rotated clockwise as viewed in Figs. 2 and 5 and the arm 74 is swung in a clockwise direction. During such clockwise movement of arm 74, the pin 76 rides up the slot in the bifurcated arm 60 and swings the arm 60 in a counterclockwise direction opening the granule control valve 56. The arms 60 and 74 are so disposed upon their respective valve stems that opening of the air valve 66 occurs just prior to the opening of the granule control valve 56 whereby air is flowing through the passageway 50 before blast granules empty thereinto. When the granule delivery or entrainment valve 56 is opened, air from the passageway 50 passes upwardly into the storage receptacle 32 pressurizing the same, and upon equalization of air pressure in the storage receptacle with the air pressure in the mixing chamber, the blast granules in the storage receptacle flow by gravity directly into the passageway 50 and are entrained in the air stream passing therethrough.

Just before turning the air control knob 68 to the "blast" position, the operator sets the timer 126 to the time interval he has pre-selected during which the blasting operation is to be performed. Thereafter he blast cleans the cylinder of the engine until the timer time interval expires and notifies him, as by means of a ringing bell, that the time interval has expired. At this instant the operator turns air control knob 68 to the "clean" position, in which the valve 66 is swung, as viewed in Figs. 2 and 5, in a counterclockwise direction through 180° of rotation. As the arm 74 is swung in a counterclockwise direction it closes the granule control valve 56 by virtue of the pin 76 on arm 74 working in the slot of the bifurcated arm 60. During such counterclockwise movement the arm 74 swings from a position in which it extends angularly upwardly and to the left as viewed in Fig. 2, through the solid outline position of Fig. 2, where the granule control valve 56 is closed, to a position extending almost vertically downwardly. Because pin 76 leaves the slot in the bifurcated arm 60 when the arm 74 moves beyond the position shown in Fig. 2, the granule control valve 56 is left in a closed position. In the "clean" position of knob 68, the passageway 69 through air control valve 66 is once again aligned with the air passageway 50 and permits compressed air to flow therethrough and to the nozzle assembly 18. With only compressed air passing to the cylinder of the engine any spent blast granules or waste products which have been loosened from the cylinder wall but not exhausted during the blasting operation, are scavenged from the cylinder. This scavenging step is continued until the operator is reasonably certain that substantially all of the remaining spent blast granules and loose waste products have been discharged from the cylinder through the exhaust line 118. Thereafter the air control knob 68 is turned to the "off" position as indicated on the panel 128, and in this position, as mentioned hereinabove, the passageway 69 through the valve 66 is disposed as shown in Fig. 5, and the arm 74 is disposed as shown in Fig. 2.

During the various steps in the operation of the apparatus as above described, the air, spent blast granules, and waste products from the walls of the cylinder are returned to the filter pod through line 118 and are discharged from spout 116 against the baffle 112 with the spent granules and wasteproducts being filtered out by the primary and secondary filters, and with the air passing out of the pod through the perforated floor 92 thereof.

The nozzle tip 130 of the nozzle 124 in the apparatus above described may be of a smaller inside diameter than was heretofore possible with the apparatus described in said Graham patent or Pyciak Patent 2,730,842, dated January 17, 1956. This smaller inside diameter of the nozzle tip results in the use of a lesser amount of compressed air for the blast cleaning of an engine cylinder than was necessary with the prior devices. With the prior apparatus, the mixing chamber was of such character that it was not suitable for entraining blast granules of a size less than that of short grained rice. Short grained rice would not pass through a nozzle tip of as small an inside diameter as that contemplated by the instant apparatus. As a consequence the nozzle tip of the prior apparatus had to be larger and with the increased size of the nozzle tip more air passed through the nozzle than is the case with the instant apparatus. Therefore my improved apparatus is adapted for use in blast cleaning combustion engine cylinders where a lesser amount of compressed air is available than was necessary with the prior devices. My improved mixing chamber hereinabove described is particularly well suited for entraining in the air stream passing to the nozzle finely crushed walnut shells, which are a very effective blast agent. With the use of finely crushed walnut shells the inside diameter of the nozzle tip may be reduced below that of the prior devices and the amount of compressed air that is necessary, with the corresponding decrease in the size of the nozzle tip, may be as much as from 20% to 30% less than that required with the prior devices.

The combination of my improved mixing chamber and the air pressure regulator contributes to a more uniform flow of blast granules to the nozzle assembly than was possible with the prior devices. The blast granules pass directly from the storage receptacle into the air stream flowing through the mixing chamber, dropping into such air stream by gravity from the storage receptacle, and there is no reliance upon a secondary air jet to impel the blast granules into the primary air stream as is the case with the apparatus disclosed in said Graham patent. During the operation of my improved apparatus, the air compressor unit which furnishes the compressed air, turns on and off as the air pressure in its pressure tank rises and falls. A disadvantage of the prior blast cleaning devices was that the air pressure in the mixing chamber would rise and fall with the air pressure in the compressor unit. This rising and falling of air pressure in the mixing chamber did not promote uniformity of operation because at one time more air and entrained blast granules would be delivered to the nozzle than at another time. With the provision of the air pressure regulator which is set at or below the minimum air pressure that the compressor unit will permit before restarting, the air pressure is held to a maximum pre-set amount and consequently a constant flow of air passes through the mixing chamber. The rate at which blast granules drop into the air stream passing through the mixing chamber is determined by the size of the port 54 and the amount that valve 56 is opened. I have found that with the valve 56 completely open and with the air pressure in the mixing chamber held substantially constant by the pressure control valve, the number of ounces of blast material which is used will not vary over one-tenth of an ounce from one cleaning operation to another.

It is also apparent that with my improved apparatus it is unnecessary to measure a determined quantity of blast granules into the mixing chamber prior to performing the blast cleaning operation as is necessary with the apparatus disclosed in said Graham patent. This saves a considerable amount of time over a number of successive cleaning operations and makes the operation of the apparatus simpler. In this connection it may be noted that an engine may be cleaned with my improved apparatus anywhere from 10% to 20% faster than with the apparatus disclosed in said Graham patent.

It is also apparent that it is possible to regulate the rate at which the blast granules are fed into the mixing chamber from the storage receptacle by adjusting the relationship between the granule control valve and the connecting linkage between the granule control valve and the air valve.

To replace the primary or secondary filters, the blast unit 12 is rotatably displaced from the position shown in Fig. 1 to a position in which the storage receptacle and filter are disposed in a substantially horizontal plane. The hand nut 96 is then removed from the bolt 94 and the shell 90 is disconnected from the casing exposing the primary and secondary filters. The rotatability of the blast unit upon the stand facilitates the removal and dispensing of the filters. Upon replacement of the filters the shell 90 may be telescoped within the open end of the casing and the nut 96 threaded on bolt 94 to again re-seal the shoulder 100 of the pod against the angular gasket 104.

In the operation of my improved apparatus, the storage receptacle 32 is first filled through the filling cap 40 with a sufficient quantity of blast granules, such as crushed walnut shells, to blast clean a plurality of engine cylinders. The cap 40 is then replaced and tightened to seal the storage receptacle. The nozzle 124 of the nozzle assembly 18 is then inserted through the spark plug opening of the cylinder to be cleaned. The air control valve knob 68 is then turned to the "blast" position, as indicated on the panel 128, and this admits air to the air passageway 50. Such air is passed through the passageway 50 and hose 122 to the nozzle 124. Immediately following the admission of air to passageway 50, the granule delivery control valve 56 is opened by the interaction of the connected arms 60 and 74 to admit air pressure to the storage receptacle 32. As soon as the air pressure within receptacle 32 is equal to the air pressure passing to the nozzle through hose 122 and passageway 50, the blast granules in receptacle 32 flow by gravity directly to passageway 50. The granules flowing into passageway 50 are entrained in the air stream passing therethrough and are carried to nozzle 124.

The operator twists and turns nozzle 124 in the spark plug opening, as more fully described in said Graham patent, to direct the entrained blast granules against the carbon coated surfaces of the combustion chamber to loosen the carbon clinging thereto. The spent blast granules and loosened carbon particles are blown back out through the spark plug opening and discharge into the filter pod through the discharge line 118 connected to passageway 120 in the nozzle assembly. The spent blast granules and carbon particles are filtered from the air passing through line 118 by the primary and secondary filter bags 106 and 102 in the filter pod, and the air passes through perforated wall 92 of the pod outwardly and into the atmosphere.

At the time that the air control valve knob 68 is turned to the "blast" position, the operator also turns the timer 126 to the pre-selected time interval during which the blasting operation is to be accomplished. Upon expiration of the blasting interval, as announced by the timer, the operator then turns the air control valve knob 68 from the "blast" position to the "clean" position. When the air control valve is turned to this latter position, the flow of blast granules from receptacle 32 into passageway 50 is discontinued by the closing of granule control valve 56. The closing of granule control valve 56 also serves to discontinue further pressurization of the receptacle 32. With control valve 66 in the "clean" position, it continues to pass air from line 64 through passageway 50 and hose 122 to the nozzle, and such air serves to scavenge any remaining spent blast granules and loosened carbon particles from the combustion chamber. If any spent blast granules should, however remain in the combustion chamber, they will be burned at the time that the engine is operated. Thereafter the operator turns the air control knob 68 from the "clean" position to the "off" position and this serves to discontinue the passage of air to nozzle 124. The operator now removes the nozzle assembly 18 from the spark plug opening and replaces the spark plug.

What I claim is:

1. In apparatus for removing carbon from the inner wall surfaces of a cylinder of an internal combustion engine: an airtight blast granule storage receptacle having a removable lid for filling with blast granules and adapted to hold at one time sufficient blast granules to remove carbon from a plurality of cylinders, an air passageway at the bottom of said receptacle communicating therewith to receive a gravity flow of blast granules directly therefrom as air passes through the passageway and also into the receptacle to pressurize the receptacle and having air intake and outlet ends, a granule delivery control valve through which communication is established between the storage receptacle and the air passageway to control the gravity flow of blast granules from the receptacle to the passageway, an air control valve in the passageway to control the flow of air therethrough, actuating means coupling the granule control valve with the air control valve for determined joint operation, an air intake line coupled with the intake end of said passageway and adapted to communicate with a source of compressed air, and an air outlet line coupled with the outlet end of said passageway and adapted to communicate with the engine cylinder to be cleaned.

2. In apparatus for removing carbon from the inner wall surfaces of a cylinder of an internal combustion engine: an airtight blast granule storage receptacle adapted to hold blast granules, an air passageway at the bottom of said receptacle communicating therewith to receive blast granules directly therefrom as air passes through the passageway and having air intake and outlet ends, a granule delivery control valve disposed between the interior of said receptacle and said air passageway and adapted to regulate the flow of blast granules from the storage receptacle to the air passageway, an air control valve in said passageway adapted to regulate the air flow therethrough, means operatively coupling the valves together for determined joint actuation including a lost motion linkage extending between the valves and operable when the air control valve is moved to one position to actuate the granule control valve to a corresponding position and operable when the air control valve is moved to another position to unaffect the position of the granule control valve, an air intake line coupled with the intake end of said passageway and adapted to communicate with a source of compressed air, and an air outlet line coupled with the outlet end of said passageway and adapted to communicate with the engine cylinder.

3. In apparatus for removing carbon from the combustion chamber of an internal combustion engine: a granule mixing chamber provided with an air passageway therethrough, a port in the mixing chamber communicating with the air passageway and adapted to communicate with a source of blast granules, an air control valve in said passageway to control the air flow therethrough, a granule control valve in said port to control the admission of blast granules to said passageway, connecting linkage extending between the two valves and including a pair of arms with one mounted on each valve and with one of the arms being bifurcated and the other arm having a part slidably received in the slot of the bifurcated arm, said linkage being operable to actuate the valve with the bifurcated arm upon actuation of the other valve to one position and inoperative to actuate the valve having the bifurcated arm when the other valve is actuated to another position.

References Cited in the file of this patent
UNITED STATES PATENTS

| | | |
|---|---|---|
| 1,073,149 | Lawrence | Sept. 16, 1913 |
| 1,641,342 | Mauney et al. | Sept. 6, 1927 |
| 1,858,561 | Ruemelin | May 17, 1932 |
| 2,253,225 | Bowes et al. | Aug. 19, 1941 |
| 2,569,952 | Ridley | Oct. 2, 1951 |
| 2,597,434 | Bishop | May 20, 1952 |
| 2,651,887 | Graham | Sept. 15, 1953 |